US008098565B2

(12) United States Patent
Dai et al.

(10) Patent No.: US 8,098,565 B2
(45) Date of Patent: Jan. 17, 2012

(54) DISC APPARATUS WITH HOLDER FOR HOLDING DISCS

(75) Inventors: Lung Dai, Taipei Hsien (TW); Jie Liu, Shenzhen (CN); Qing-Min Liu, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 848 days.

(21) Appl. No.: 12/176,423

(22) Filed: Jul. 21, 2008

(65) Prior Publication Data

US 2009/0187931 A1 Jul. 23, 2009

(30) Foreign Application Priority Data

Jan. 22, 2008 (CN) .......................... 2008 1 0300183

(51) Int. Cl.
*G11B 7/26* (2006.01)
*A45F 5/00* (2006.01)

(52) U.S. Cl. ........................................ 369/273; 224/682

(58) Field of Classification Search .................. 369/261, 369/273; 206/308.1, 308.2; 312/9.55, 9.64; 224/682

See application file for complete search history.

(56) References Cited

U.S. PATENT DOCUMENTS

| | | | | |
|---|---|---|---|---|
| 5,190,153 | A * | 3/1993 | Schultz et al. | 206/308.1 |
| 5,638,962 | A * | 6/1997 | Price, Jr. | 211/41.12 |
| 5,704,474 | A * | 1/1998 | Oland | 206/308.1 |
| 5,713,464 | A * | 2/1998 | Chang | 206/308.1 |
| 6,128,265 | A * | 10/2000 | Leung | 720/655 |
| 6,375,057 | B1 * | 4/2002 | Gorchian | 224/682 |
| 6,522,613 | B1 * | 2/2003 | Frankeny et al. | 720/655 |
| 6,719,133 | B2 * | 4/2004 | Perez et al. | 206/308.2 |
| 6,795,381 | B2 * | 9/2004 | Ando et al. | 369/30.03 |
| 6,862,739 | B1 | 3/2005 | Hunter et al. | |
| 6,926,139 | B1 * | 8/2005 | Poole | 206/232 |
| 6,948,177 | B2 * | 9/2005 | Rafferty | 720/600 |
| 7,374,041 | B2 * | 5/2008 | Bonzagni et al. | 206/308.1 |
| 7,954,116 | B2 * | 5/2011 | Ng et al. | 720/600 |
| 2002/0105886 | A1 * | 8/2002 | Ramonowski | 369/75.1 |
| 2004/0187143 | A1 * | 9/2004 | Tolkachev et al. | 720/655 |
| 2006/0163091 | A1 * | 7/2006 | Kwan | 206/308.2 |
| 2006/0164929 | A1 * | 7/2006 | Marshall | 369/30.01 |

FOREIGN PATENT DOCUMENTS

CN 1722289 A 1/2006

* cited by examiner

*Primary Examiner* — Brian Miller
(74) *Attorney, Agent, or Firm* — Altis Law Group, Inc.

(57) ABSTRACT

A disc apparatus includes a player and a holder. The player is configured for reading an optical disc, the player comprising a first latching portion. The holder is configured for holding extra optical discs, the holder comprising a second latching portion. The first latching portion and the second latching portion are capable of attaching the holder to the player cooperatively.

20 Claims, 9 Drawing Sheets

DISC APPARATUS WITH HOLDER FOR HOLDING DISCS

BACKGROUND

1. Field of the Invention

The present invention generally relates to a disc apparatus for reading and holding optical discs.

2. Description of Related Art

Most portable optical disc players are single disc players. As such, when a user is on the road and wants to listen to more than one disc he/she must have a separate holder/case to carry the extra discs. In practice, however, the holder or case is frequently forgotten or lost.

Therefore, an improved disc holding apparatus is needed in the industry to address the aforementioned deficiency.

SUMMARY

A disc apparatus includes a player and a holder. The player is configured for reading an optical disc, the player comprising a first latching portion. The holder is configured for holding extra optical discs, the holder comprising a second latching portion. The first latching portion and the second latching portion are capable of attaching the holder to the player cooperatively.

Other advantages and novel features of the present invention will become more apparent from the following detailed description of preferred embodiment when taken in conjunction with the accompanying drawings.

DETAILED DESCRIPTION

Figure 1:
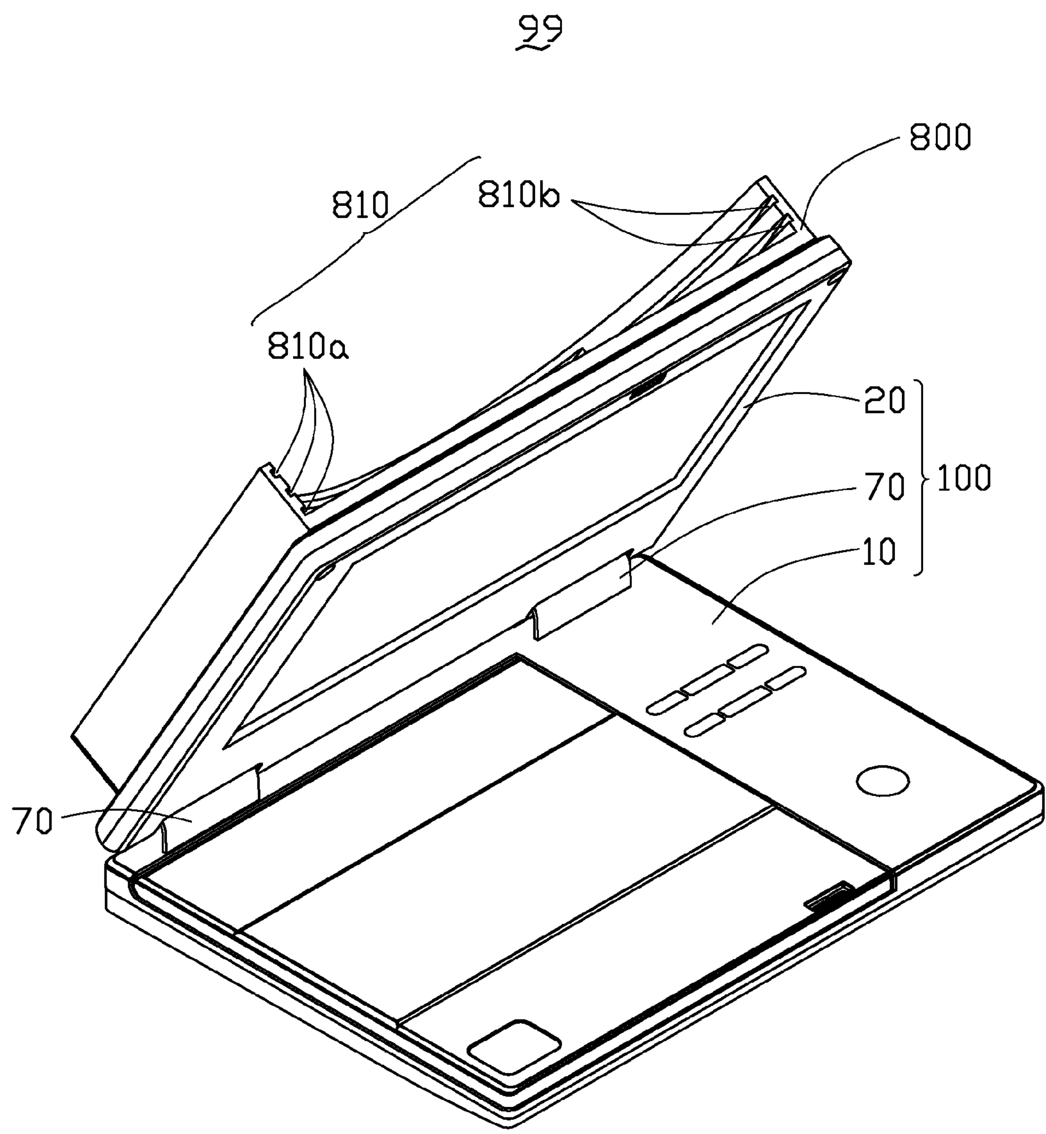
FIG. 1 is a schematic diagram showing a disc apparatus in accordance with an exemplary embodiment.

Referring to FIG. 1, a disc apparatus 99 in accordance with an exemplary embodiment includes a player 100 and a holder 800 attached to the player 100. The player 100 includes a mainbody 10, a lid 20, and a pivot mechanism 70. The lid 20 is pivotally connected to the mainbody 10. In a closed state, the lid 20 is folded over the mainbody 10. The holder 800 is on the outer side of the lid 20 away from the mainbody 10. In an opened state, the lid 20 is flipped open from the mainbody 10.

Figure 2:
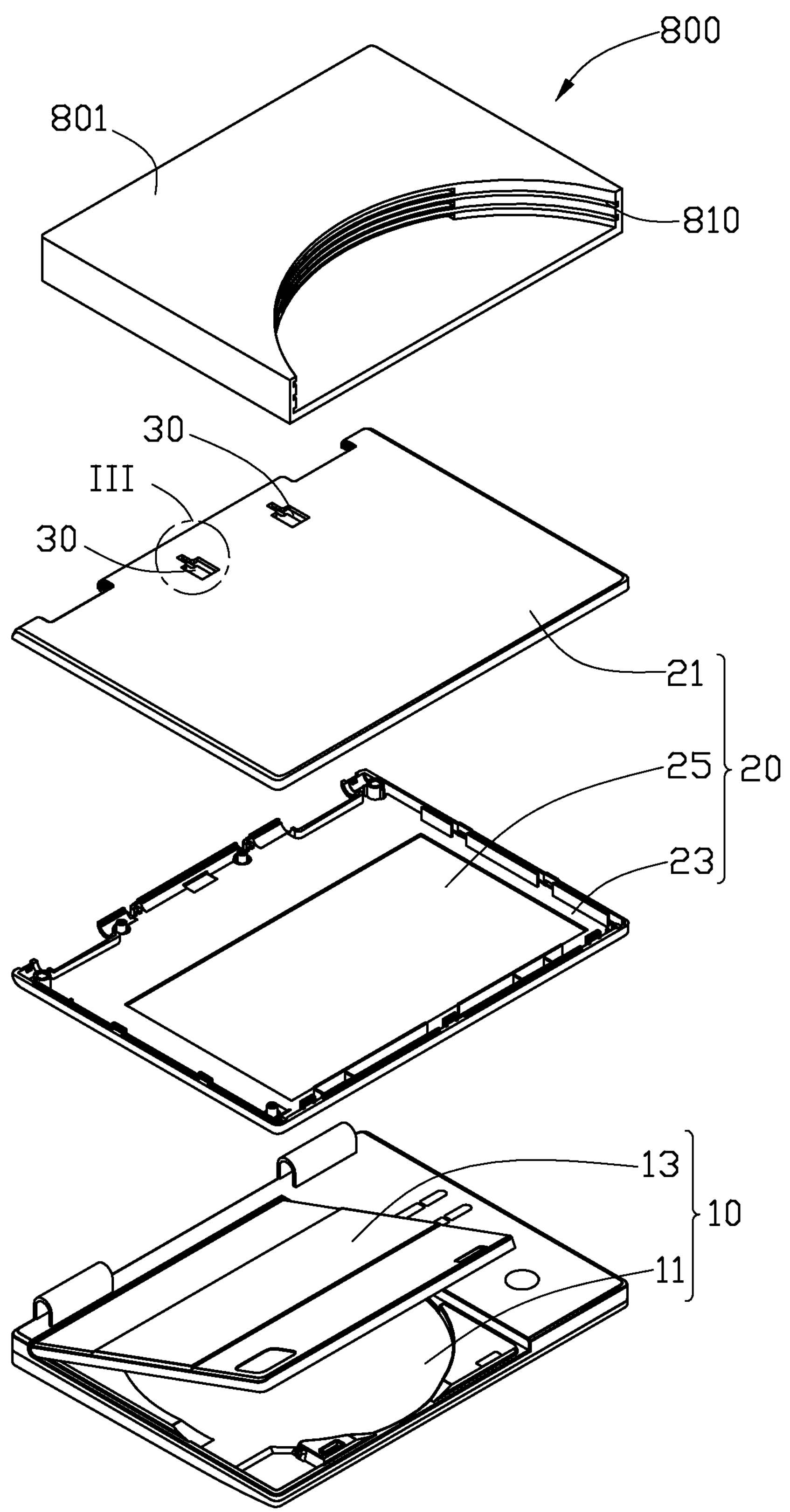
FIG. 2 is an exploded, schematic diagram showing the disc apparatus of FIG. 1, and the disc apparatus includes a lid and a holder.

Further referring to FIG. 2, the mainbody 10 includes a tray 11 for receiving an optical disc (not shown) and a cover 13 for protecting the optical disc. The tray 11 and the cover 13 cooperatively accommodate the optical disc. The lid 20 includes an upper plate 21, a lower plate 23, and a display screen 25. The display screen 25 is fixed between the upper plate 21 and the lower plate 23. The lower plate 23 also defines a window (not shown) for exposing a part of the display screen 25, thus information displayed by the display screen 25 can be viewed. An outer surface of the upper plate 21 forms two female latching portions 30 for latching the holder 800.

The holder 800 includes a disc rack 801. Five receiving slots 810 are defined in the disc rack 801 for accommodating optical discs. Three receiving slots 810*a* (see FIG. 1) are defined in a side of the disc rack 801, and two receiving slots 810*b* are defined in another side of the disc rack 801 opposite to the 810*a*. Furthermore, the three receiving slots 810*a* and the second receiving slots 810*b* are interleaved arranged in a middle superposed area. In another embodiment, the number and the arrangement of the receiving slots 810 can be other values and shapes, respectively.

Figure 6:
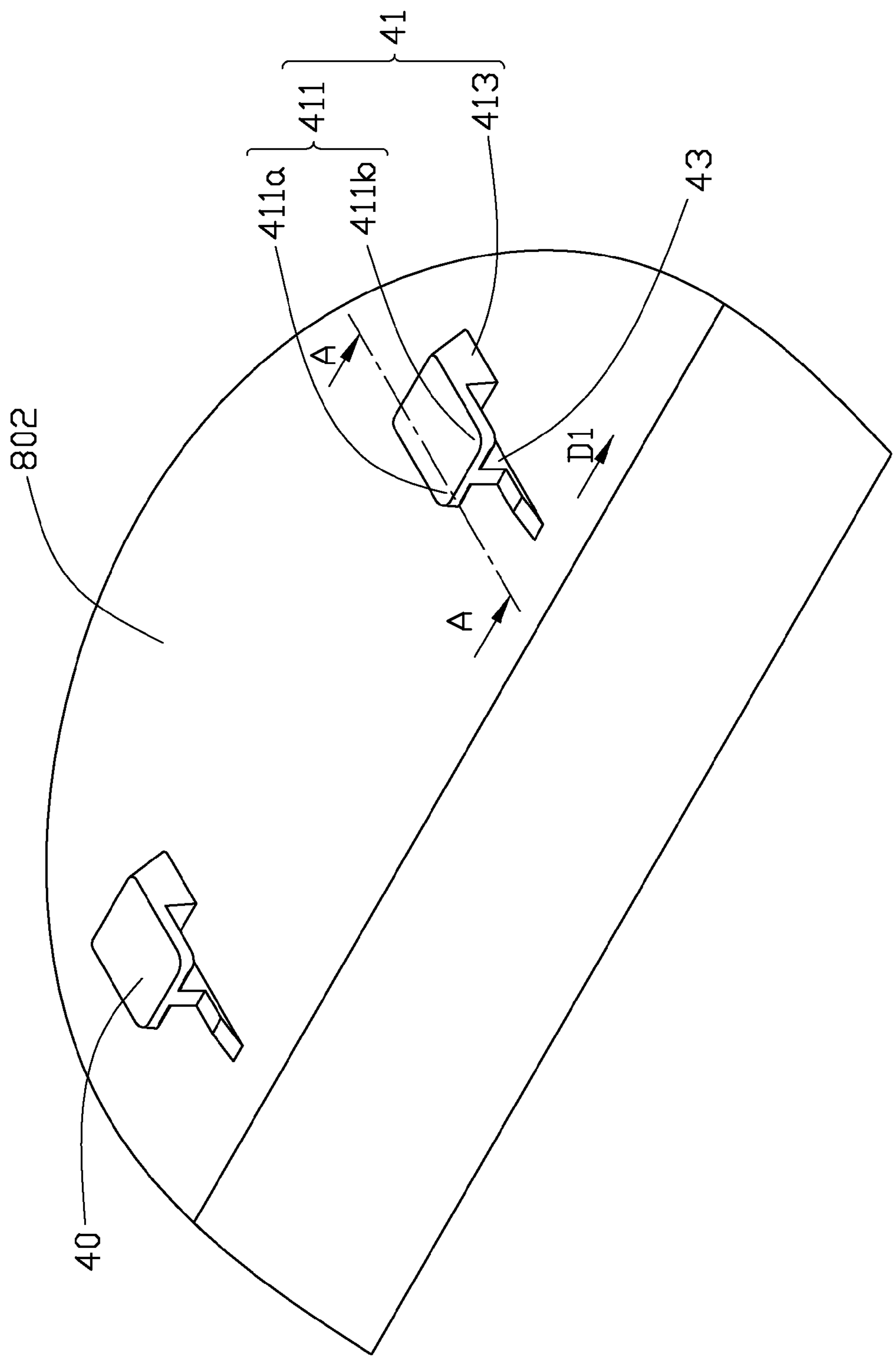
FIG. 6 is a partial enlarged view of the cartridge of FIG. 4 from another side.

Further referring to FIG. 6, two male latching pieces 40 are formed on a bottom plate 802 of the disc rack 801 corresponding to the female latching portions 30 of the lid 20. Each female latching portion 30 and a corresponding male latching portion 40 cooperatively latch together to attach the holder 800 to the lid 20.

Figure 3:
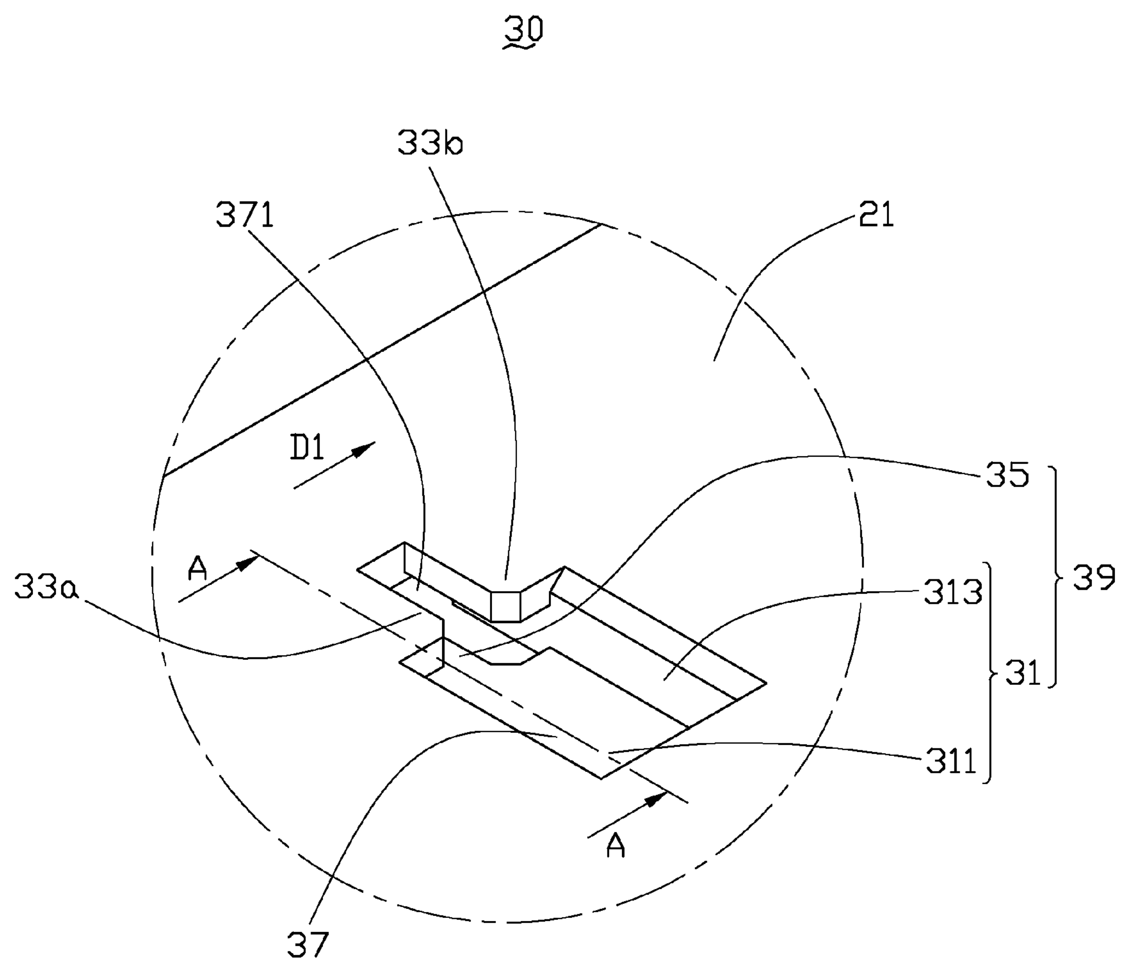
FIG. 3 is a partial enlarged view of a circled portion III of FIG. 2.
Figure 4:
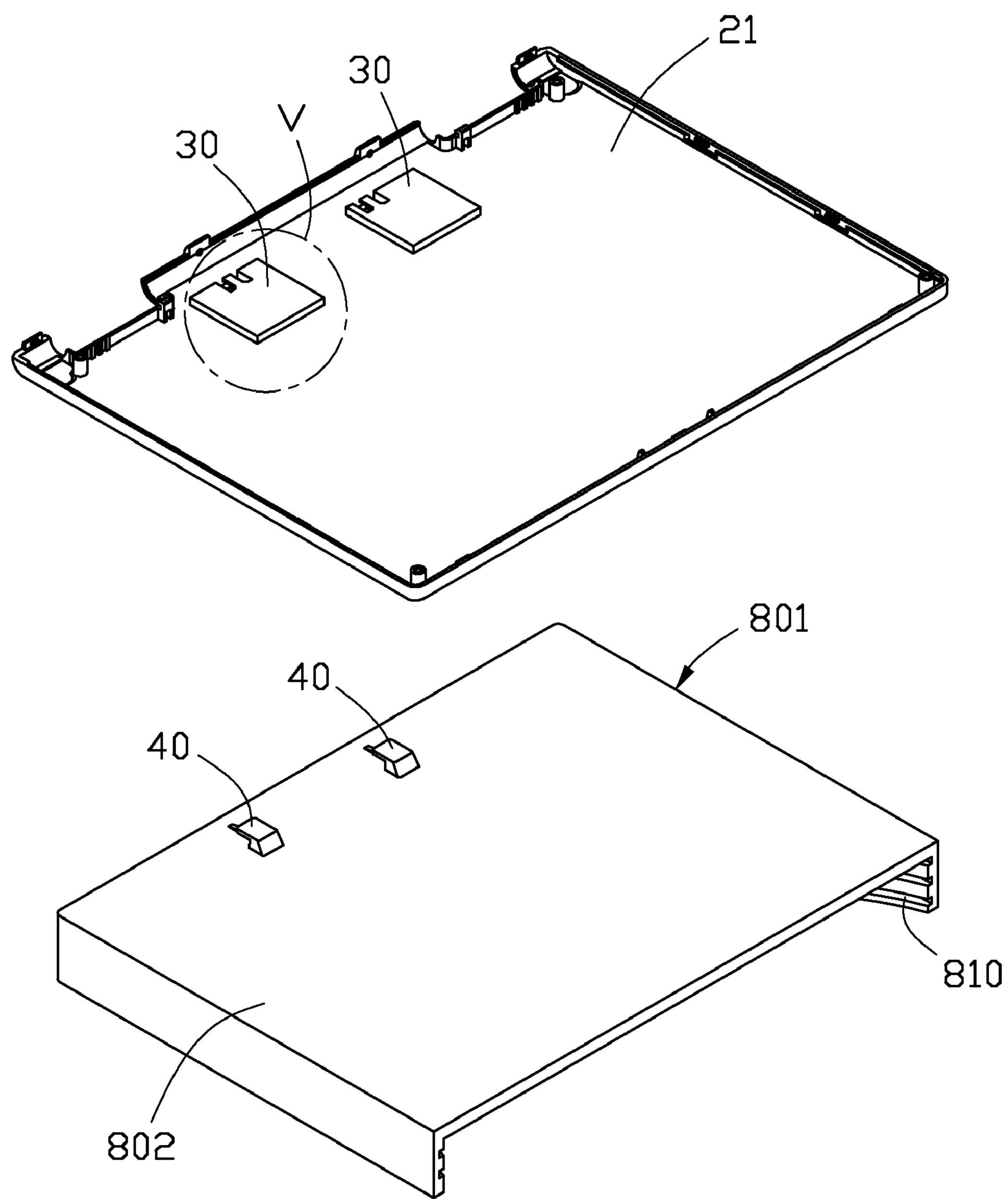
FIG. 4 is a disassembled, schematic diagram showing the lid and the cartridge of FIG. 2, viewed from an inversed side.
Figure 5:
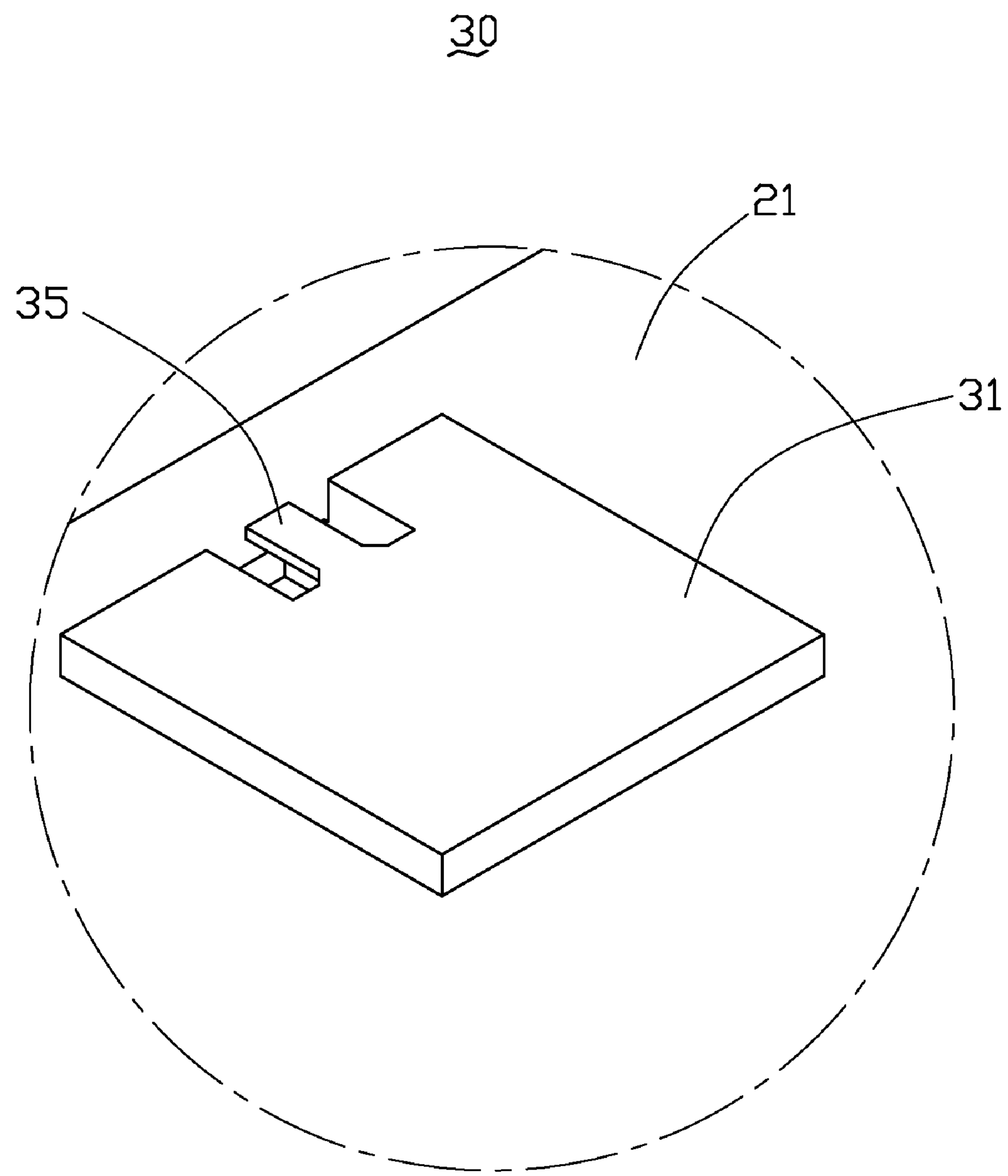
FIG. 5 is a partial enlarged view of a circled portion V of FIG. 4.

Referring to FIGS. 3-5, also, each female latching portion 30 is formed in the upper plate 21. To more clearly describe the exemplary embodiment, only one of the female latching portion 30 is detailed. The female latching portion 30 defines a latching space 37 in the outer surface of the upper plate 21. The latching space 37 is formed by an interior structure 31, two portions 33*a*, 33*b* extending from the outer surface of the upper plate 21 partially over the latching space 37 and towards each other. The interior structure 31 includes two sidewalls 313, a base floor 311 extending from the two sidewalls 313, and a cantilever 35 extending from the base floor 311. The base floor 311 and the cantilever 35 are parallel to the upper plate 21. The cantilever 35 and the base floor 311 compose of a supporting board 39 corresponding to the latching space 37. The portions 33*a*, 33*b* define a gap 371 therebetween corresponding to the cantilever 35. The gap 371 is a part of the latching space 37.

Each male latching portion 40 includes a L-hook portion 41 for hooking inner surfaces of the portions 33*a*, 33*b*, and a neck portion 43 connecting the L-hook portion 41 and the bottom plate 802. The L-hook portion 41 includes a head part 411 and a base part 413 formed on the bottom plate 802. The head part 411 extending from the base part 413 is a plate parallel to the bottom plate 802. A midline area of the head part 411 is connected to the bottom plate 802 via the neck portion 43. The head part 411 includes two hooking members 411*a*, 411*b* arranged in two sides of the midline area of the head part 411. A width of the head part 411 is bigger than that of the gap 371 along a first direction D1 (see FIGS. 3 and 6), and a width of the neck portion 43 is smaller than that of the gap 371 along the direction D1.

Figure 7:
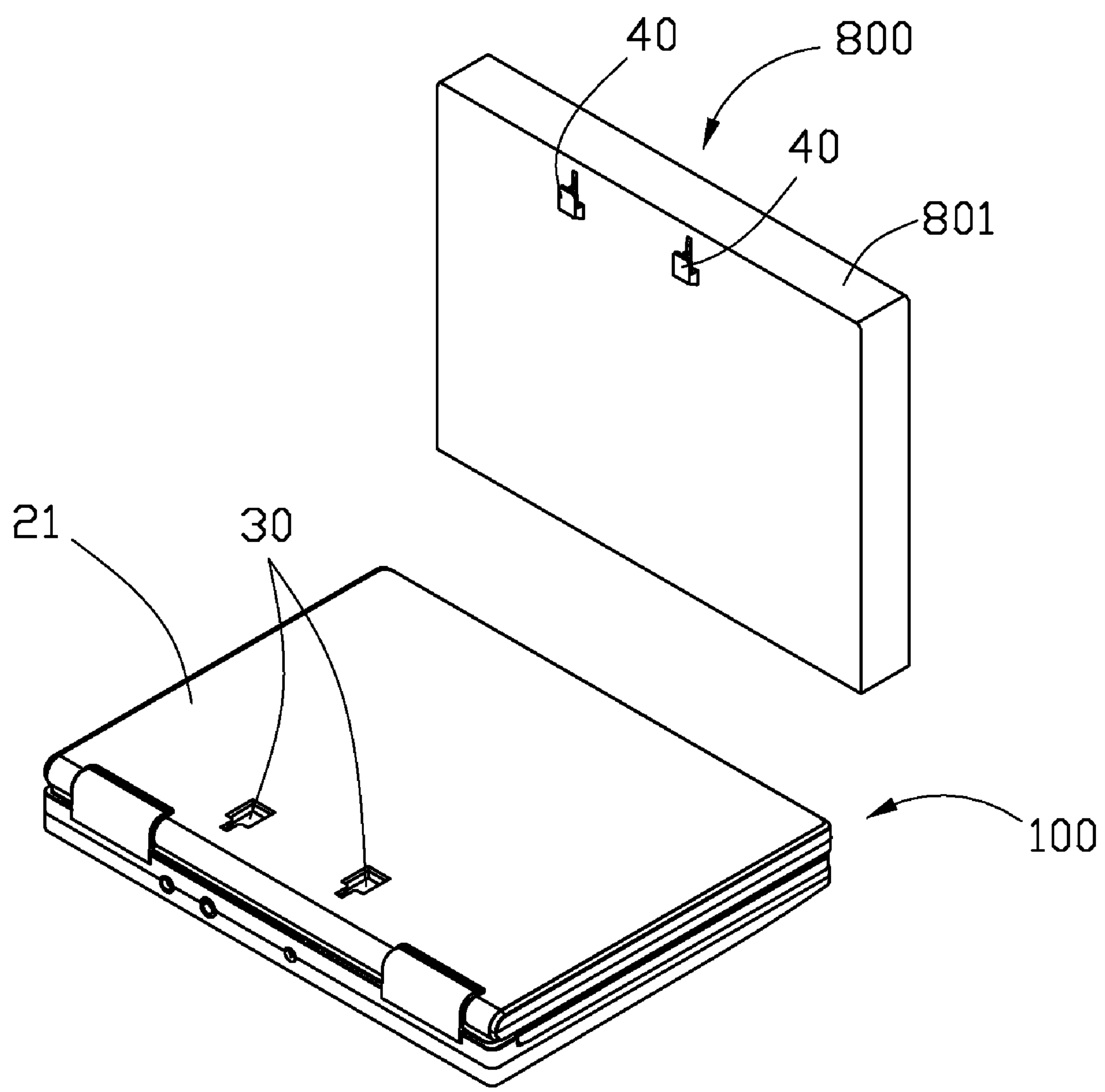
FIG. 7 is a partial disassembled, schematic diagram showing the disc apparatus of FIG. 1.
Figure 8:
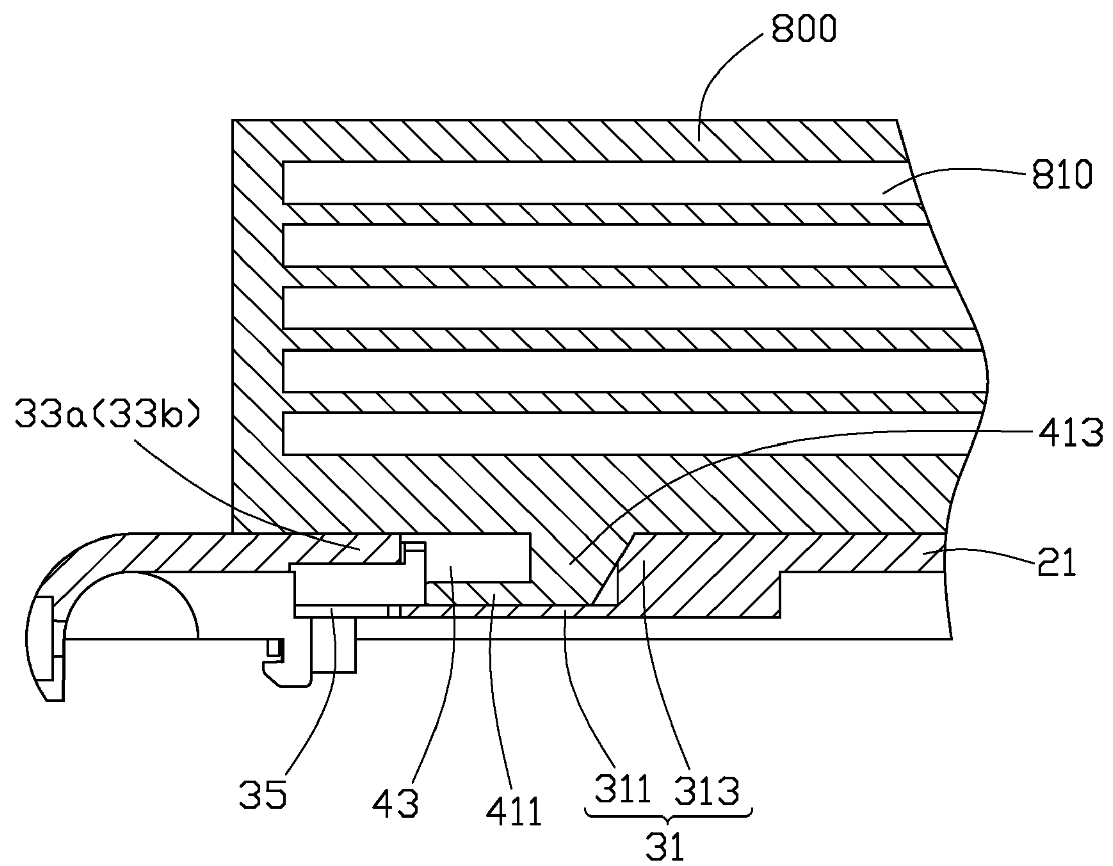
FIG. 8 is a partial cross-sectional view of the disc apparatus of FIG. 2 during an assembling procedure, but the cross-sectional view is taken along line A-A of FIGS. 3 and 6.
Figure 9:
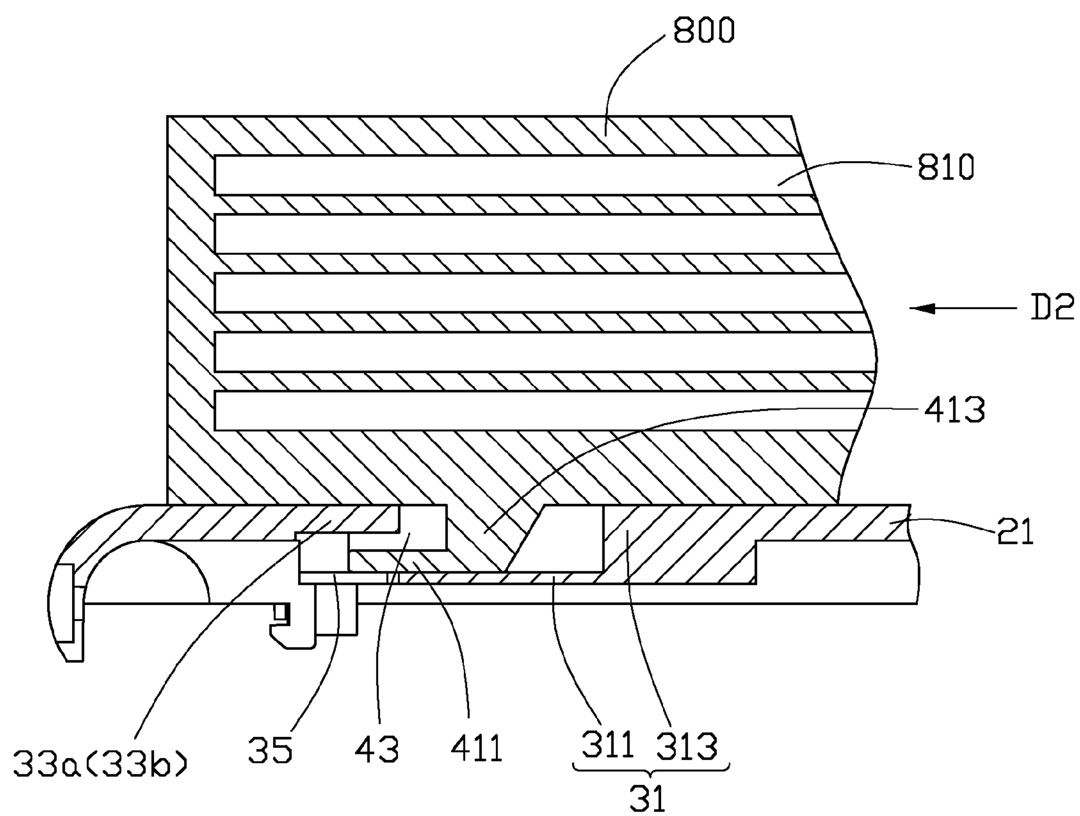
FIG. 9 is a partial cross-sectional view of the disc apparatus of FIG. 2 after the assembling procedure, but the cross-sectional view is taken along line A-A of FIGS. 3 and 6.

Further referring to FIGS. 7-9, in assembly, the male latching portion 40 of the holder 800 is inserted into the interior structure 31 of the upper plate 21 of the female latching portion 30. Subsequently, the holder 800 is forced to move along a second direction D2. The neck portion 43 is inserted in the gap 371, and the hooking members 411*a*, 411*b* are restricted under the portions 33*a*, 33*b* respectively. As a result, the holder 800 is attached to the lid 20.

As mentioned above, the female latching portions 30 and the male latching portions 40 cooperatively attach the holder 800 to the lid 20. Therefore, optical disc can be carried along with the disc apparatus 99. In other embodiments, the female latching portion 30 may be positioned on the lid 20 and the male latching portion 40 correspondingly positioned on the holder 800 or one female latching portion 30 and one male latching portion 40 can be positioned on the lid 20 and the holder 800. In addition, the female latching portions 30 and the male latching portions 40 can also be used to attach the holder 800 to the mainbody 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disc apparatus comprising:

a player for reading an optical disc, the player comprising:
- a first latching portion;
- a main body and a lid pivotally connected to the main body, the lid comprising an upper plate, a lower plate, and a display screen fixed between the upper plate and the lower plate; and a holder for holding the optical disc, the holder comprising a second latching portion;

wherein the first latching portion and the second latching portion are capable of attaching the holder to the player cooperatively.

2. The disc apparatus according to claim 1, wherein the first latching portion defines a latching space in the player.

3. The disc apparatus according to claim 2, wherein the first latching portion comprises an interior structure forming the latching space.

4. The disc apparatus according to claim 3, wherein the first latching portion comprises two portions extending from the player partially over the latching space and towards each other.

5. The disc apparatus according to claim 4, wherein the interior structure comprises two sidewalls, a base floor extending from the two sidewalls, and a cantilever extending from the base floor.

6. The disc apparatus according to claim 5, wherein the portions define a gap therebetween corresponding to the cantilever.

7. The disc apparatus according to claim 6, wherein the second latching portion comprises a L-hook portion for hooking the portions.

8. The disc apparatus according to claim 7, wherein the L-hook portion comprises a head part and a base part formed on the holder, and the head part extends from the base part to be parallel to the holder.

9. The disc apparatus according to claim 8, wherein the second latching portion comprises a neck portion connecting a midline area of the head part to the holder.

10. The disc apparatus according to claim 9, wherein the head part comprises two hooking members arranged on two sides of the midline area of the head part.

11. The disc apparatus according to claim 10, wherein a width of the head part is bigger than that of the gap, and a width of the neck portion is smaller than that of the gap.

12. The disc apparatus according to claim 1, wherein the first latching portion is formed on the mainbody.

13. The disc apparatus according to claim 1, wherein the first latching portion is formed on the upper plate.

14. A disc apparatus comprising:

a player for reading an optical disc, the player comprising a first latching portion defining a latching space in the player, the latching portion comprising:
- an interior structure forming the latching space, the interior structure comprising two sidewalls, a base floor extending from the two sidewalls, and a cantilever extending from the base floor; and
- two portions extending from the player partially over the latching space and towards each other; and a holder for holding the optical disc, the holder comprising a second latching portion;

wherein the first latching portion and the second latching portion are capable of attaching the holder to the player cooperatively.

15. The disc apparatus according to claim 14, wherein the portions define a gap therebetween corresponding to the cantilever.

16. The disc apparatus according to claim 15, wherein the second latching portion comprises a L-hook portion for hooking the portions.

17. The disc apparatus according to claim 16, wherein the L-hook portion comprises a head part and a base part formed on the holder, and the head part extends from the base part to be parallel to the holder.

18. The disc apparatus according to claim 17, wherein the second latching portion comprises a neck portion connecting a midline area of the head part to the holder.

19. The disc apparatus according to claim 18, wherein the head part comprises two hooking members arranged on two sides of the midline area of the head part.

20. The disc apparatus according to claim 19, wherein a width of the head part is bigger than that of the gap, and a width of the neck portion is smaller than that of the gap.

* * * * *